Jan. 22, 1952          T. S. DAYTON          2,583,042
COMBINATION GUN SIGHT AND RANGE FINDER Filed Feb. 6, 1946          6 Sheets-Sheet 1

*INVENTOR.*
THEODORE S. DAYTON
BY
ATTORNEY

Jan. 22, 1952     T. S. DAYTON     2,583,042
COMBINATION GUN SIGHT AND RANGE FINDER Filed Feb. 6, 1946     6 Sheets-Sheet 2

INVENTOR.
THEODORE S. DAYTON
BY

ATTORNEY

Jan. 22, 1952     T. S. DAYTON     2,583,042
COMBINATION GUN SIGHT AND RANGE FINDER Filed Feb. 6, 1946     6 Sheets-Sheet 3

*INVENTOR.*
THEODORE S. DAYTON

BY

ATTORNEY

Jan. 22, 1952 T. S. DAYTON 2,583,042
COMBINATION GUN SIGHT AND RANGE FINDER
Filed Feb. 6, 1946 6 Sheets-Sheet 4

INVENTOR.
THEODORE S. DAYTON
BY
ATTORNEY

Jan. 22, 1952 T. S. DAYTON 2,583,042
COMBINATION GUN SIGHT AND RANGE FINDER
Filed Feb. 6, 1946 6 Sheets-Sheet 5

INVENTOR.
THEODORE S. DAYTON
BY 
ATTORNEY

Jan. 22, 1952     T. S. DAYTON     2,583,042
COMBINATION GUN SIGHT AND RANGE FINDER
Filed Feb. 6, 1946     6 Sheets-Sheet 6

*INVENTOR.*
THEODORE S. DAYTON
BY

ATTORNEY

Patented Jan. 22, 1952

2,583,042

UNITED STATES PATENT OFFICE 2,583,042

COMBINATION GUN SIGHT AND RANGE FINDER

Theodore S. Dayton, Portland, Oreg.

Application February 6, 1946, Serial No. 645,727

12 Claims. (Cl. 33—50)

This invention relates to combination gun sights and range finders and is particularly adapted to rifles, such as hunting rifles and army rifles, and may be used on large guns or artillery.

The primary object of the invention is to provide a method of ranging on targets of a known size wherein a simple adjustment is made so that the rifle will have the correct elevation to compensate for the fall in the flight of the projectile.

In order to carry out this object an adjustment is made of the device to correspond to the height or dimension of a known target previous to sighting. When the rifle is sighted through the scope a simple adjustment is made at this time to bring a horizontal sighting wire and range wire into position for framing the target. When this is accomplished the sight wire will be brought to the proper position within the scope to compensate for the fall of the projectile corresponding to the range. When the sight wire and vertical wire intersection is next raised to the desired location on the target the muzzle of the gun will have been raised sufficiently to compensate for the fall of the projectile at this particular range.

The novel features that are considered characteristic of the invention are set forth with particularity in the appended claims. The invention itself, however, both as to its organization and its method of operation, together with additional objects and advantages thereof, will best be understood from the following description of a specific embodiment, when read in connection with the accompanying drawings, wherein like reference characters indicate like parts throughout and in which—

Figure 3 is an enlarged cross sectional view of the combined gun sight and range finder, taken on line 3—3 of Figure 1 looking in the direction indicated.

Figure 18:
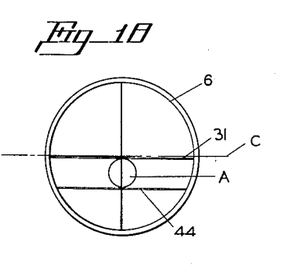
Figure 18 is a diagrammatic view looking through the scope illustrating a close up of the target framed between the range wire and the sight wire and centered on the vertical wire.

Referring specifically to the drawings, I am first going to illustrate by diagrammatic views the concept and the operation of my new and improved combined sight and range finder. We will assume that the target A as seen through the scope, Figure 18, is a maximum size target that will be brought into range and in this view the target as illustrated is at the closest range where there will be practically no fall in the projectile flight.

Figure 17:
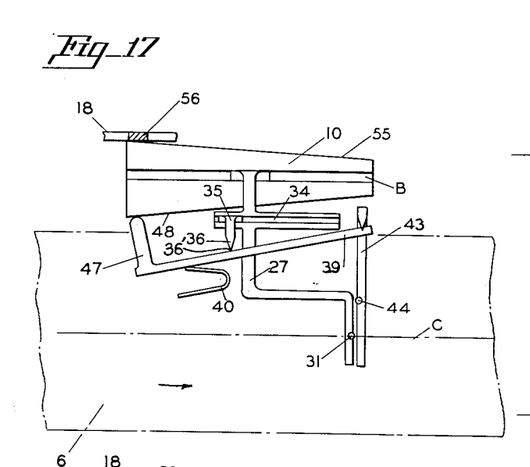
Figure 17 is a diagrammatic illustration of the principle of my new and improved combined sight and range finder.

Referring to Figure 17, a cam 10 is illustrated in a projected diagrammatic form and with its upper cam surface 55 bearing against the underside of a fixed limit stop 56. For illustrative purposes I show the sighting wire holding frame 27 being positioned by the horizontal guide B in the diagrammatic views. In reality this does not appear in this manner in the mechanical drawings of my device, which will be described later, but it does illustrate the fact that the frame 27 is held in a definite relationship to the cam 10 and will move therewith.

The sight wire 31 is mounted to the frame 27 and moves therewith. The range wire 44 is mounted to the frame 43, which is positioned by the pivot bar 39. The pivot bar 39 is forced against the pivot block fulcrum 36 midway its length and is held thereagainst by the spring 40, which is mounted to a stationary frame, not shown. The push rod 47 is mounted to the end of the pivot bar and contacts the bottom surface 48 of the cam 10. The fulcrum point 36 forms part of the pivot block 35 which is movably mounted within the guide or recess 34 and is adjustable therealong for changing the fulcrum point 36 relative to the pivot bar.

I will now describe the operation of my combination sight and range finder. The cam 10 is shown in Fig. 17 in the initial starting position. The pivot block 35 is shown having its fulcrum 36 on the pivot bar 39 at a point 36′ which is adjusted longitudinally of the bar 39 in accordance with the size of the target. As viewed through the scope, referring to Fig. 18, in the direction of the arrow in Fig. 17 the sight wire 31 is shown on the horizontal center line C and the range wire 44 just framing the target A, which is the maximum spacing between sight wire 31 and range wire 44, in accordance with the position of the cam 10 in Fig. 17. It will be noted that the sight wire 31 and the range wire 44 are inverted in Figs. 18, 20, 22, 23 and 24, which illustrate the view through the telescope 6, relative to their actual positions as shown in Figs. 17, 19 and 21, because of optical inversion by the telescope lenses.

Figure 19:
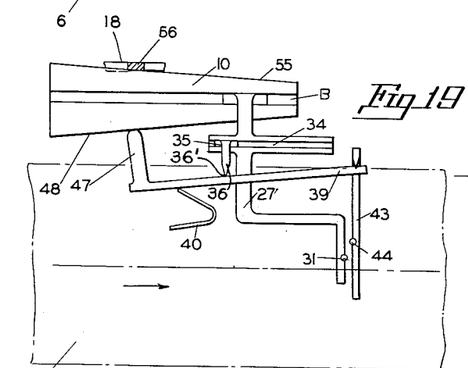
Figure 19 is an advanced position of the diagrammatical position of the mechanism as it would be in position for a greater distance on the same size target as illustrated in Figures 17 and 18.
Figure 20:
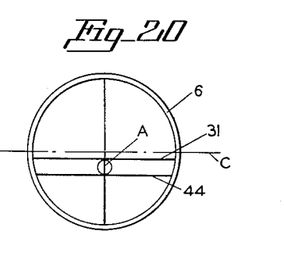
Figure 20 is a diagrammatic view looking through the scope of the position shown in Figure 19 where the target appears smaller and where the sight wire is moved from the horizontal line of the scope to compensate for the drop of the projectile.

Referring now to Figures 19 and 20, while viewing the target A, which is the same target as that shown in Figure 18, but at a greater range, the target will appear somewhere between the range wire and the sight wire, and by moving the cam 10 to the left, as shown in Figure 19, the cam also will move upwardly due to the incline of its cam surface 55 bearing against the guide 56, thereby raising the frame 27 and the sight wire 31. At the same time, the pivot bar 39 is caused to pivot about the fulcrum 36 due to the push rod 47 following the inclined cam surface 48, thereby lowering the frame 43 and the range wire 44 until it frames the target A as viewed through the scope 6 (Figure 20).

Figure 24:
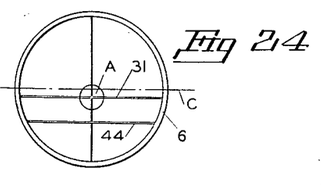
Figure 24 illustrates a diagrammatic view through the scope, which corresponds to all of the above targets and illustrates the sight wire and the vertical wire intersecting point of aim on the target after the range has been set.

In doing this, it will be noted in Fig. 20 that the sight wire 31 is spaced from the horizontal center line C at the same time the range wire 44 is brought towards the sight wire by the action of the cam surfaces 55 and 48. In other words, upon movement of the cam 10 its upper surface 55 will cause said cam to move vertically and carry the sight wire 31 and the range wire 44 therewith; however, the lower cam surface 48 will simultaneously cam the range wire 44. When this is accomplished the sight wire 31 will have been spaced the proper distance from the center line C of the scope to compensate for the drop or the fall of the projectile at this particular range, then when the sight wire is brought to the center of the target A, as illustrated in Figure 24, the projectile will strike the center of the target. The positioning of the sight wire in the middle of the target A as in Figure 24, will cause the raising of the muzzle of the rifle to the desired elevation.

Figure 21:
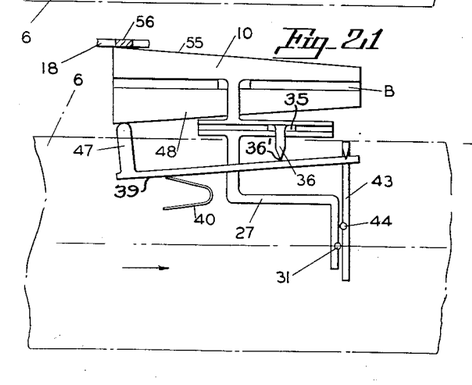
Figure 21 is a diagrammatic view of the mechanism wherein a smaller target is being sighted, showing the range and sight wire adjusted closer together in their initial stage.

In Figure 21 I illustrate the pivot block 35 having been adjusted so that its fulcrum 36 has been moved to the right on the pivot bar 39, thereby reducing the distance between the sight wire 31 and the range wire 44 and causing a lesser vertical movement of the frame 43 when the push rod 47 rides over the surface 48 of the cam 10. This is a setting for a relatively small target at the same range as shown in Figures 17 and 18, and this is made before the rifle is sighted, which will be described in detail.

Figures 22, 23:
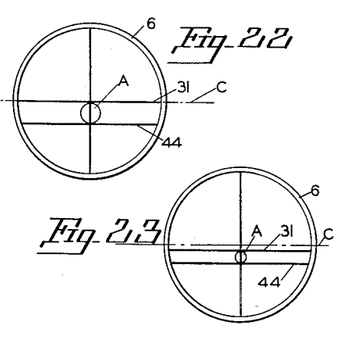
Figure 22 illustrates a diagrammatic view through the scope showing the smaller target with the sight wire on the horizontal center line which indicates no projectile drop.
Figure 23 illustrates at a greater range the same size target as shown in Figure 22, wherein the sight wire is shown offset from the center line of the scope compensating for the projectile fall for this greater range.

Figure 22 illustrates the target A of a smaller size being sighted where the sight wire 31 is on the horizontal center line of the scope indicating minimum range at which the scope is sighted in.

Figure 23 illustrates the target A at a greater range and after the cam 10 has been moved so as to bring the sight wire 31 and the range wire 44 to the position for framing the target as illustrated in Figure 23, it will be noted that the sight wire 31 is the same distance from the horizontal line C, Figure 23, as it is in Figure 20, but that the space between the sight wire 31 and the range wire 44 is less. It is also true that the projectile drop would be just the same on any size target at the same range and that when the pivot block 35 has been previously adjusted for the known target size the spacing of the wires will equal the apparent size of the target as seen through the scope, then when the sight wire is brought to the center of the target as illustrated in Figure 24, the muzzle of the gun will have been elevated to the proper angle.

Figure 1:
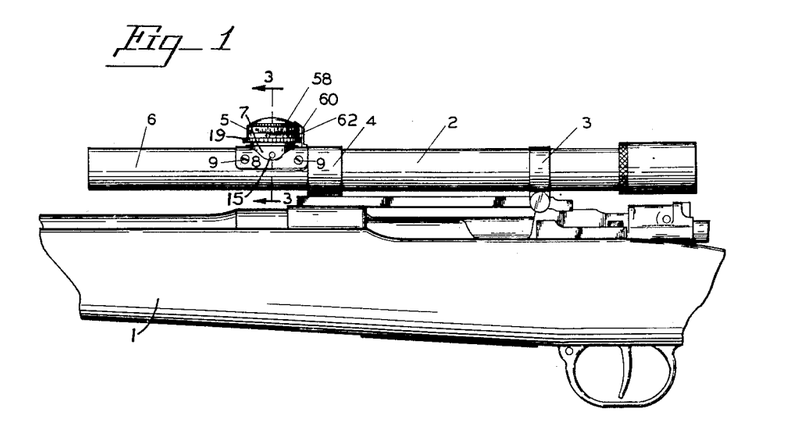
Figure 1 is a view of the scope mounted on the gun having my new and improved combined gun sight and range finder mounted thereon, parts of the gun broken away.
Figure 2:
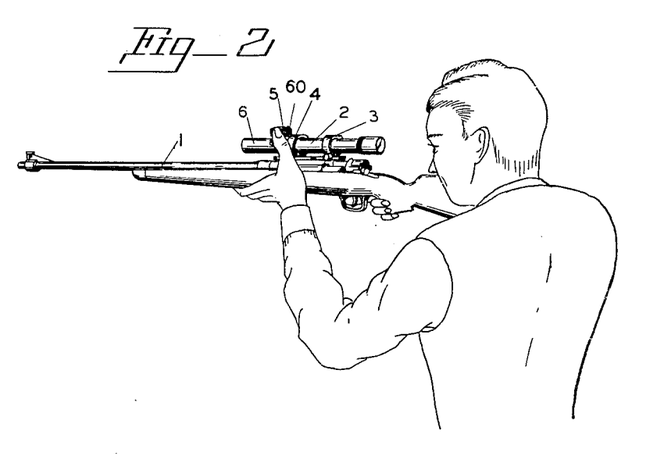
Figure 2 illustrates the gun and sight being sighted showing the simple operation of the sight.

I will now describe in detail the mechanism for accomplishing the range adjustment and sighting as hereinbefore explained. Referring to Figures 1 and 2, the rifle is indicated at 1, having my new and improved combination sight and range finder 2 mounted thereon by suitable brackets 3 and 4. My invention includes a range finding device 5 combined with a telescopic sight 6. My combined sight and range finder comprises a tubular body portion 7 forming part of the saddle 8, which is mounted to the scope 6 by suitable fastening means, as screws 9.

Figure 7:
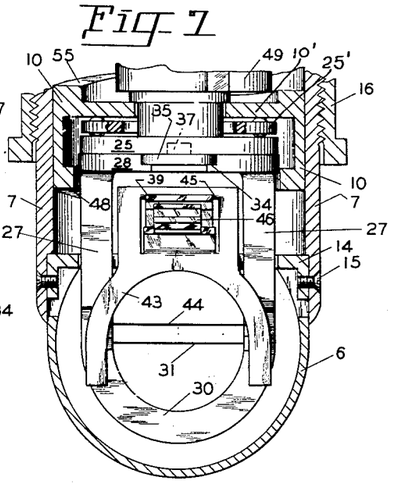
Figure 7 is a cross sectional view taken on line 7—7 of Figure 5, having parts broken back a greater distance for convenience of illustration.
Figure 8:
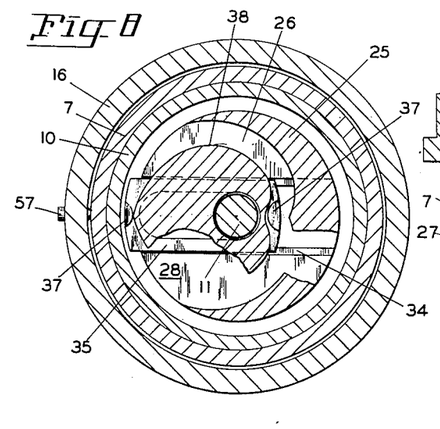
Figure 8 is a plan sectional view taken on line 8—8 of Figure 5 illustrating the cam mechanism for determining the position of the range finding cross wires.
Figure 9:
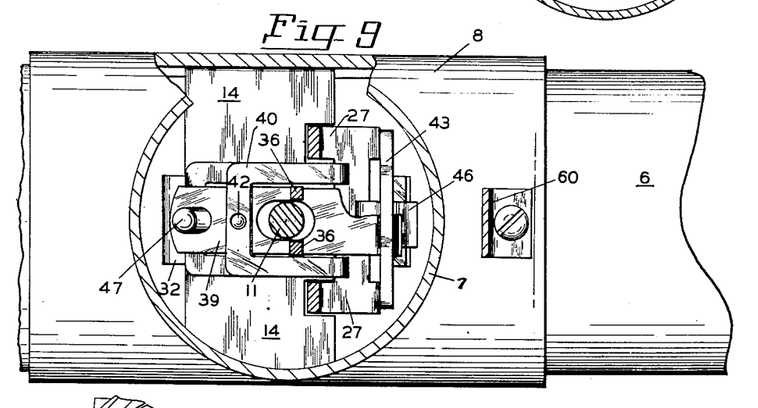
Figure 9 is a plan cross sectional view taken on line 9—9 of Figure 5 illustrating the cross wire mounting apparatus.
Figure 10:
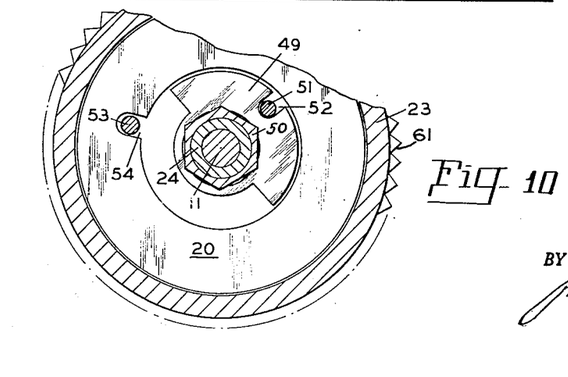
Figure 10 is a fragmentary plan sectional view taken on line 10—10 of Figure 5.

Centrally and vertically journalled within the body 7 is a shaft 11. The lower end 12, Figure 3, of the shaft 11 is journalled within a suitable bearing 13 located centrally of the cross frame or plate 14, which is fixedly secured within the lower part of the housing 7 by the screws 15 as best shown in Figs. 7 and 9. A sleeve or collar 16 is threadedly mounted to the upper end of the housing 7 by the screw threads 17. The upper end of this sleeve supports the annular ring 18 the surface of which forms a bearing race for an anti-friction bearing 21. A range adjusting sleeve 19 has a horizontal flange 20 formed inwardly to ride on the bearing 21. In addition, the upper surface of the flange 20 forms a bearing race for an anti-friction bearing 22, which in turn supports the target size control knob 23. The control knob 23 is fixedly mounted to the shaft 11 and maintains the shaft in alignment with the center line of the housing 7 at its upper end directly over its lower bearing 13. The annular ring 18 and the flange 20, including the knob 23, governs the position of the general assembly through the operation of the cam 10, which is rotatably mounted in the tubular body 7 as best shown in Fig. 3. The cam 10, as previously described, determines the position of the range wire and the sight wire relative to a predetermined size target and range. The preferred form of the cam 10 is best shown in perspective in Fig. 14.

Figure 5:
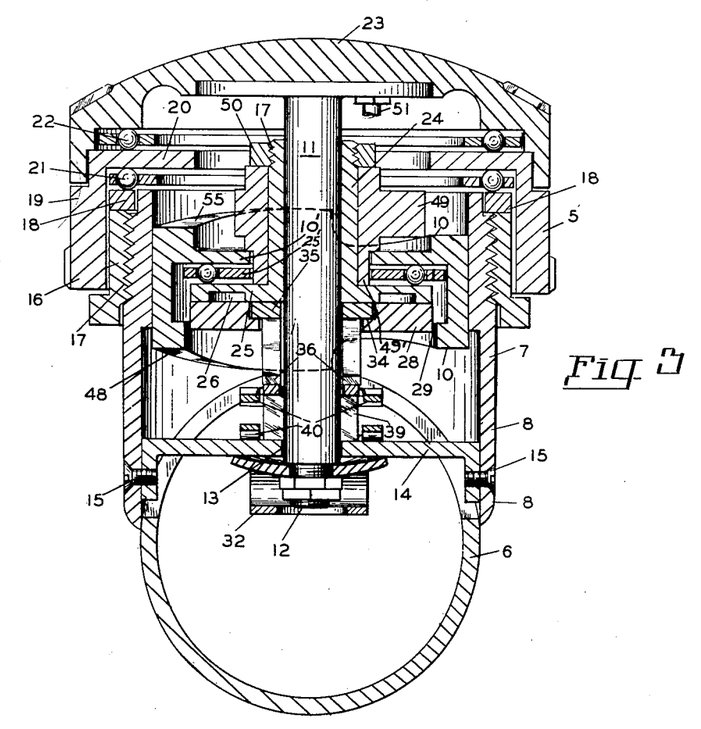
Figure 5 is an enlarged sectional view taken on line 5—5 of Figure 4, looking in the direction indicated.
Figures 11, 12, 13, 14, 15, 16:
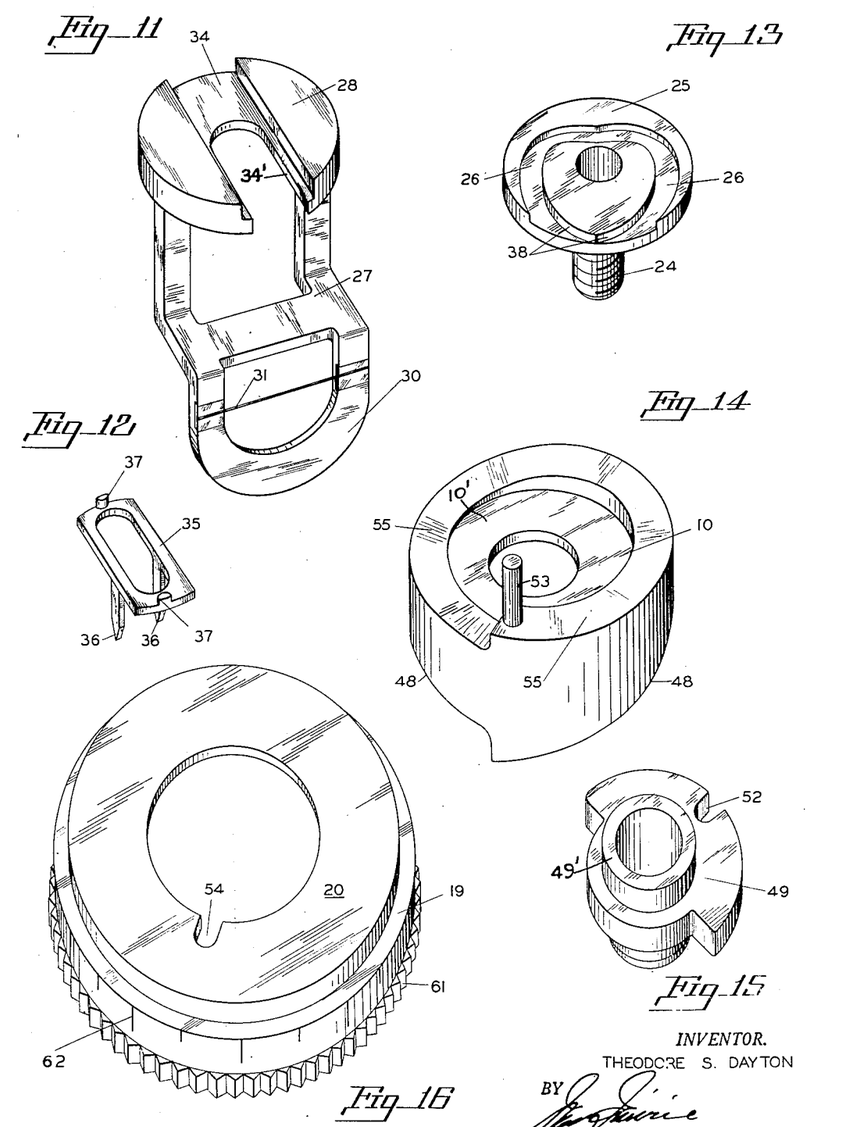
Figure 11 is a perspective view of the frame to which the sighting cross wire is mounted.
Figure 12 is a perspective view of the pivot block which is mounted within the slotted plate illustrated in Figure 11.
Figure 13 is an inverted perspective view of the cam for moving the pivot block above mentioned in the slotted plate and frame shown in Figure 11.
Figure 14 is a perspective view of the cam for adjusting the position of the range wire and the sight wire relative to one another, range and target size.
Figure 15 is a perspective view of a limit stop for controlling the operation of the cam shown in Figure 14.
Figure 16 is a perspective view of the dial or control knob for adjusting the sighting and range wires to the target giving correct elevation of gun for range involved.

Rotatably journalled to the shaft 11 is a hollow sleeve 24, which has a flange 25 extending radially therefrom. This element is illustrated in an inverted perspective view in Figure 13 to show a cam groove 26 that is formed on the underside of the flange 25, the purpose of which will be described later. A sight wire holding frame 27 is fixed at its upper end to the plate 28 which, as shown in Figs. 5 and 11, is provided with a groove 34 in its upper side and with a radially extending slot 34' within the groove 34. The plate 28 is slotted to fit around the shaft 11 to be held in alignment within the hollow bottom 29 of the cam 10. The frame 27 is provided at its lower end with a U-shaped frame 30 which supports the sight wire 31 transversely of the telescope 6 as best shown in Figs. 5 and 7. The frame 27 is supported and held in position by the spring 32, which is fixedly secured at 33 to the cross frame or plate 14. This spring 32 thus forces the frame 27 and its plate 28 upwardly against the flange 25 of the sleeve 24 and biases the sleeve 24 upwardly on the shaft 11.

Slidably mounted within the groove or recess 34 of the plate 28, is a pivot block or frame 35, best shown in Fig. 12, having fulcrum points 36 extending downwardly through the slot 34' of the plate 28, as shown in Figs. 3, 5 and 7. Cam followers 37, extend upwardly into the cam groove 26 of the plate 25, the followers actually contacting the cam edge surface 38 and being controlled thereby. A pivot bar 39 rides against and under the fulcrum points 36 somewhere midway its length. A U-shaped spring 40 is fixed at one end to the cross plate or frame 14 by a fastener 41 and at the other end to the pivot bar 39 by a fastener 42. The spring 40 biases the bar 39 upwardly against the fulcrum points 36 as well as holding the bar 39 against endwise movement.

A frame 43 of inverted U-shape has the range wire 44 mounted thereacross at its lower end, as best shown in Figs. 5, 7 and 9, and is pivotally suspended from a notch 45 in one end of the pivot bar 39. A spring 46 biases the range wire frame 43 against the sight wire frame 30 in parallel side-by-side contact, as best illustrated in Figures 5 and 7. Mounted to the opposite end of the pivot bar 39 is a push rod or cam follower 47 which rides against the lower cam surface 48 of the cam 10.

As best shown in Fig. 5, the cam 10 rides freely in the sleeve housing 7 and is biased upwardly, with its upper cam surface 55 in constant engagement with the fixed stop 56, by the dual action of the springs 32 and 40. As previously stated, the spring 32 resiliently supports the frame 27 and its plate 28 which in turn supports the flange 25 of the sleeve 24. The flange 25 supports, on its upper surface, an anti-friction bearing 25' which in turn supports a flange 10' that extends inwardly of the cam 10. In addition, the cam 10 is directly supported by the pin 47 of the pivot bar 39 which is resiliently supported by the spring 40.

Figure 6:
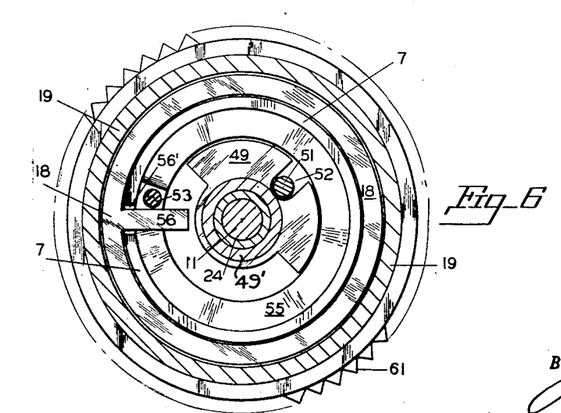
Figure 6 is a plan sectional view taken on line 6—6 of Figure 5.

Referring to Figs. 3, 5, 6, 10 and 15, a limit stop 49 is carried by a sleeve 49' which is telescoped about and locked to the sleeve 24 by the locking nut 50 and revolves therewith. Extending downwardly from the knob 23 is an operating pin 51, which passes through the notch 52 located in the periphery of the limit stop 49, as best shown in Figure 6. When the knob 23 is revolved the operating pin 51 is carried therewith, also revolving the limit stop 49, the sleeve 24, the flange 25 together with its cam surface 38, which moves the pivot block 35 transversely of the slotted plate 28 and within the recess 34, changing the position of the fulcrum points 36 relative to the pivot bar 39 and its distance from the cam follower pin 47 and the notch 45. This adjustment provides a relative adjustment between the sight wire 31 and the range wire 44 to accommodate the sighting of various sized targets.

I will now describe the mechanism for determining the range finding of the device. The sleeve 19 is adjusted when the rifle is brought into sighting position, as illustrated in Figure 2, by the thumb of the operator until the range wire and the sight wire frame the target as hereinbefore described in relation to the diagrammatic views illustrated in Figures 20 and 23. When the sleeve 19 is revolved, its flange 20 moves the pin 53 about the center of the device, best illustrated in Figure 10, by the notch 54 engaging the pin. The pin 53 is fixedly mounted to the upper surface 55 of the cam 10, best illustrated in Figures 5, 6 and 14. When the sleeve is rotated as stated above, the pin 53 is moved therewith rotating the cam 10. The upper surface 55 engages the underneath surface of the limit guide 56 which forms part of the annular ring 18 and which is held in a fixed relative position of the device by the notch 56' located on the upper end of the stationary body 7.

Referring to Figures 3, 5 and 6, and particularly to Figure 5, the sleeve 24 is free to slide vertically on the shaft 11 and as above described the limit stop 49 is fixedly secured to the said sleeve by the locking nut 50 and revolves said sleeve, and, as previously described, the frame 27 is maintained in contact with the flange 25 of the sleeve 24 by the action of the springs 37 and 40 which force this assembly upward on the shaft 11. The primary cam 10 limits this upward movement through the action of its inwardly extending flange 10' bearing on the ball race 25' which bears on the top surface of the flange 25, and, as hereinbefore described, the surface 55 of the cam contacts the underside of the limit stop 56, which forms part of the annular ring 18, limiting the upward movement of the cam and the sleeve 24, the position of which will be determined on the position of the cam 10 under the limit stop 56. The ball race 21, the flange 20, the ball race 22 and the control knob 23 resist the upward movement of the annular ring 18, together with the cam 10, sleeve 24 and the frame 27 caused by the upward force of the springs 32 and 40.

As the cam 10 is revolved, its surface 55 bearing against the underside of the limit stop 56 allows the cam to move vertically within the housing sleeve 7 and the movement causes the vertical movement of the frame 27 and the sight wire 31, which also allows the fulcrum points 36 to move vertically permitting the pivot bar 39 to move, together with the frame 43, carrying the range wire 44. At the same time this is happening, the cam follower 47 rides on the surface 48 of the cam 10 pivoting the pivot bar about the fulcrum points 36 and allowing the frame 43 to move relatively, varying the gap between the sight wire 31 and the range wire 44 until it frames the target through the scope as illustrated in Figures 20 and 23.

When the target has been framed the sight wire 31 is centered on the target as illustrated in Figure 24. The device may be adjusted to any rifle in the following manner. The sight wire may be adjusted to correspond with the impact of a bullet, as for instance at one hundred yards, by adjusting the sleeve collar 16 up or down. This determines the position of the ring 18 and the stop guide 56 which, as described before, positions the range and sight wire assembly through the action of the cam 10. A locking screw 57 maintains the sleeve 16 in adjusted position once this adjustment has been made for the particular mounting and it will remain in this location.

Figure 4:
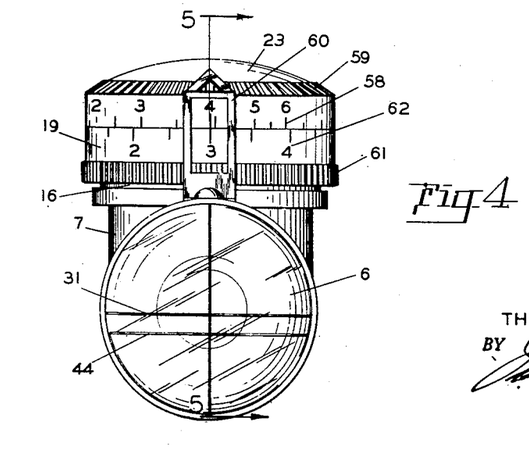
Figure 4 is an enlarged end sectional view of the scope, showing the range finder and sight as it would appear to the operator.

I will briefly describe at this time the operation of the device. The target size control knob 23, which has a scale 58 scribed thereon and representing the height of the target to be sighted, is revolved by means of the knurling 59 until the size of the target is framed within the pointer 60, as best shown in Figure 4, and visible from the rear of the gun, as illustrated in Figure 2. This adjustment is made prior to sighting the rifle.

When the target is being sighted the range adjusting sleeve 19 is revolved by means of the knurling 61. This revolves the cam 10 bringing the sight wire 31 and range wire 44 together, framing the target after which the sight wire is sighted on the desired location of the target. The scale 62 on the sleeve 19 indicates the range of the target to the operator through the pointer 60, although this is not necessary to see because when the size of the target adjustment is made by the control knob 23, no calculations are required by the operator other than to rotate the range sleeve 19 until the cross wires 31 and 44 frames the target, as best shown in Figures 20 and 23. The shape of the cam 10, which is designed for the particular type of ammunition, automatically positions the wires to compensate for the fall in the projectile at any range.

I do not wish to be limited to the exact mechanical detail structure, as other mechanical equivalents may be substituted still coming within the scope of my claims.

What I claim is:

1. A combined gun sight and range finder mechanism, including a telescope, a housing secured to and extending beyond the telescope, a primary cam movable in said housing for setting the mechanism for target size, a secondary cam movable in said housing, manual means carried by the housing for independent adjustment of the cams, sight carrying and range finder members movable in the telescope, and connections between said members and the respective cams for varying the influence of the cams in their adjustment on the sight carrying member and range finding member.

2. A combined gun sight and range finder, including a telescope, a primary cam rotatably mounted in the telescope for adjustment in accordance with target size, a secondary cam rotatably mounted in the telescope, means arranged beyond the telescope and secured thereto for adjusting the primary cam, means for adjusting the secondary cam, a range finder member bridging the telescope, a sight carrying member extending into the telescope, a range finder indicator in the range finder member, a sight indicator in the sight carrying member, a lever supported in the telescope, means connected with the lever to be operated by the primary cam, means connecting the range indicating member to one end of the lever, a frame forming part of the sight carrying member and cooperating with the secondary cam above the lever, and an element depending from the frame and bearing on the lever to compel the lever in operation with the secondary cam to actuate the range finder member.

3. A construction as defined in claim 4, wherein the lever is provided at one end with a depression, and wherein the range finder member is formed with an opening to receive the lever to be supported in said depression, and said spring cooperates with the range finder member and the lever to resiliently maintain the range finder member in the depression in the lever.

4. In a combined gun sight and range finder, a telescope, a casing carried by the telescope and projecting beyond the same, a lever having a spring connection with the casing, a primary cam for operating the lever, a manually rotatable cap carried by the casing, means projecting from the cap for adjusting the primary cam in the rotation of the cap in accordance with known target size, a secondary cam arranged around the primary cam and free thereof, a manually operable member mounted on the casing, means between the member and the secondary cam for adjusting the secondary cam, a sight carrying member bridging the telescope, a sight indicator carried thereby, a frame movably supported by the upper portion of the sight carrying member, a bar depending from the frame and forming a fulcrum for the lever, said frame being laterally adjustable in either direction by the adjustment of the primary cam to shift said fulcrum relative to the lever, a range finder member projecting into the telescope and formed at the upper end to cooperate with one end of the lever, a spring bearing between the lever and a portion of the range finder member to maintain the connection therebetween, and means between the secondary cam and the sight member and range finder member for moving said indicator transverse the telescope in the operation of the lever under the secondary cam.

5. A sight and range finder mechanism comprising a telescope, a sight indicator, a range finder indicator, individual elements respectively supporting said indicators, means including a cam for initially setting the mechanism for target size, means for moving said elements simultaneously to frame the target as viewed through the telescope, and means responsive to the operation of the size setting means for controlling the movement of said element-moving means to determine accurate framing of the target in accordance with target size setting, said latter means including a lever operable by said cam for moving one of said elements in opposite direction relative to the other of said elements during target-framing.

6. A combined gun sight and range finder comprising a telescope, independent elements movable across the telescope, a sight indicator mounted in one of said elements, a range finder indicator mounted in the other of said elements, a bar movably mounted relative to the elements and cooperating with said range finder element, and an adjustable cam for moving said sight element and for controlling the movement of said bar for adjusting said range finding element relative to said sight element to cause the indicators to frame a target of the size determined by the adjustment of the cam.

7. A combined gun sight and range finder comprising a telescope, independent elements movable across the telescope, a sight indicator mounted in one of said elements, a range finder indicator mounted in the other of said elements, a bar movably mounted relative to said elements and cooperating with both, an arm carried by one of said elements for forming a fulcrum for the movement of the bar, means for moving the other of said elements in response to the movement of said bar on said fulcrum, and an adjustable cam controlling the movement of the bar for adjusting the elements to cause the indicators to frame a target of the size determined by the adjustment of the cam.

8. A construction as defined in claim 7 wherein said fulcrum arm is movably supported by its element for movement longitudinally of the bar by adjustment of the cam to adjust one element and its indicator, the adjustment of the fulcrum arm varying the swing of the bar to thereby adjust the movement of said element and its indicator relative to the other element and its indicator in accordance with target size.

9. A range finding sight mechanism comprising a sighting device, a horizontal sight indicator normally centrally intersecting the field of said sighting device, a horizontal range indicator intersecting the field of said sighting device, a lever supporting said range indicator, a fulcrum for said lever movably supported by said sight indicator, means for adjusting said fulcrum to move said range indicator relative to said sight indicator in accordance with target size, and a cam for simultaneously moving said sight indicator and said lever to move said indicators relative to each other in opposite directions to frame the target as viewed in the field of the sighting device and to adjust said sight indicator relative to its normal position to compensate for the range of the target.

10. A range finding sight mechanism comprising a sighting device, a horizontal sight indicator normally centrally intersecting but movable across the field of said sighting device, a horizontal range indicator movable across the field of said sighting device and relative to said sight indicator, a lever supporting said range indicator, a fulcrum for said lever movably supported by said sight indicator, a rotatable cam for moving said fulcrum and adjusting said lever to move said range indicator relative to said sight indicator in accordance with target size, and a second rotatable cam co-axial with said first cam for simultaneously moving said sight indicator and said adjusted lever to move said indicators in opposite directions to frame the target as viewed in the field of the sighting device and to adjust said sight indicator relative to its normal position to compensate for the range of the target.

11. A combined gun sight and range finder comprising a telescope including a housing, range and sight finding mechanism within said housing and including a sight indicator and range indicator both movable relative to each other and across the line of sight through said telescope, means within said housing for initially setting said mechanism for known target size, manually operated means on the housing for operating said size setting means, means within said housing for simultaneously moving said indicators to frame the target as viewed through the telescope, manually operated means on the housing for operating said moving means, and means within the housing responsive to the operation of the size setting means for controlling operation of the indicator means.

12. In a telescope sight for a gun having a barrel, a telescope including a housing disposed longitudinally relative to the gun, range and sight finding mechanism within said housing and including a sight indicator and range indicator both movable relative to each other and across the line of sight through said telescope, manually operable means within said housing for initially setting said mechanism for known target size, manually operated means within said housing for simultaneously moving said indicators to frame the target as viewed through the telescope, means within the housing responsive to the operation of the size setting means for controlling operation of the indicator means, and means on said housing for immovably fixing said sight to the gun.

THEODORE S. DAYTON.

REFERENCES CITED

The following references are of record in the file of this patent:

UNITED STATES PATENTS

| Number | Name | Date |
|---|---|---|
| 2,094,623 | Stokey | Oct. 5, 1937 |
| 2,155,389 | Arden | Apr. 25, 1939 |
| 2,155,390 | Arden | Apr. 25, 1939 |

FOREIGN PATENTS

| Number | Country | Date |
|---|---|---|
| 1,204 | Great Britain | of 1888 |
| 28,194 | Great Britain | of 1911 |